May 14, 1963 W. H. PAYNE 3,089,470
METHOD AND APPARATUS FOR INHIBITING AUTO-IGNITION
IN INTERNAL COMBUSTION ENGINES
Filed June 1, 1959

INVENTOR
William H. Payne
BY Popp and Sommer
ATTORNEYS

United States Patent Office 3,089,470
Patented May 14, 1963

3,089,470
METHOD AND APPARATUS FOR INHIBITING AUTO-IGNITION IN INTERNAL COMBUSTION ENGINES
William H. Payne, Olean, N.Y., assignor, by mesne assignments, to Dresser Industries, Inc., Dallas, Tex., a corporation of Delaware
Filed June 1, 1959, Ser. No. 817,227
4 Claims. (Cl. 123—25)

This invention relates to a method and apparatus for inhibiting auto-ignition in internal combustion engines of the spark ignited type.

The problem of auto-ignition arises when higher compression ratios are employed in order to economize on fuel consumption. With a higher compression ratio, the final temperature of the compressed combustible mixture of air and fuel immediately prior to purposeful ignition is raised. This final temperature can rise to a high enough level that the compressed combustible mixture will ignite automatically and before ignition is intended to begin or to be completed. Such a condition is known as auto-ignition which may be of two types. One is pre-ignition, that is, ignition beginning before it is intended; and the other is detonation, that is, simultaneous burning or explosion of the combustible mixture after its ignition has begun, as opposed to intended progressive burning. Either or both types of auto-ignition can be extremely destructive to the engine in which such condition occurs and is to be avoided.

The present invention is concerned with inhibiting auto-ignition preferably in a 2-cycle turbo-charged gas engine in order to gain the advantage of increased efficiency by operating the engine at a higher compression ratio.

There are techniques presently known for reducing the tendency towards auto-ignition in turbo-charged engines. One is to evaporatively cool the air entering the blower inlet. This practice is useful up to a point. Another technique is to provide a cooling means of a suitable type, such as a heat exchanger or turbo-expander, between the blower discharge and the cylinder inlet to remove the heat of compression. The installation of such a cooling system can be expensive. Still another technique is to spray a fine mist of water or other cooling liquid into the inlet of the blower so that the liquid will be evaporated and remove the heat of compression. The disadvantage of this last-mentioned technique is that dissolved solids in the water or other liquid used precipitate on the blower wheel, destroying its efficiency. Solid particles suspended in the water or other liquid used can be readily removed by filtering and while electrostatic and chemical demineralizers may be employed to reduce the amount of dissolved solids to an unobjectionable level, such equipment and its maintenance is expensive.

It is accordingly the primary object of the present invention to reduce effectively, economically and materially the tendency toward auto-ignition without incurring the disadvantages of the prior art techniques. Briefly this is achieved by injecting a liquid auto-ignition suppressant as a fine spray directly into the engine cylinder and in such amount and at such time that dissolved solids in the liquid suppressant will not be precipitated on surfaces of the engine.

Other objects and advantages of the present invention will be apparent from the following description and accompanying drawing wherein.

Figures 1, 2, 3:
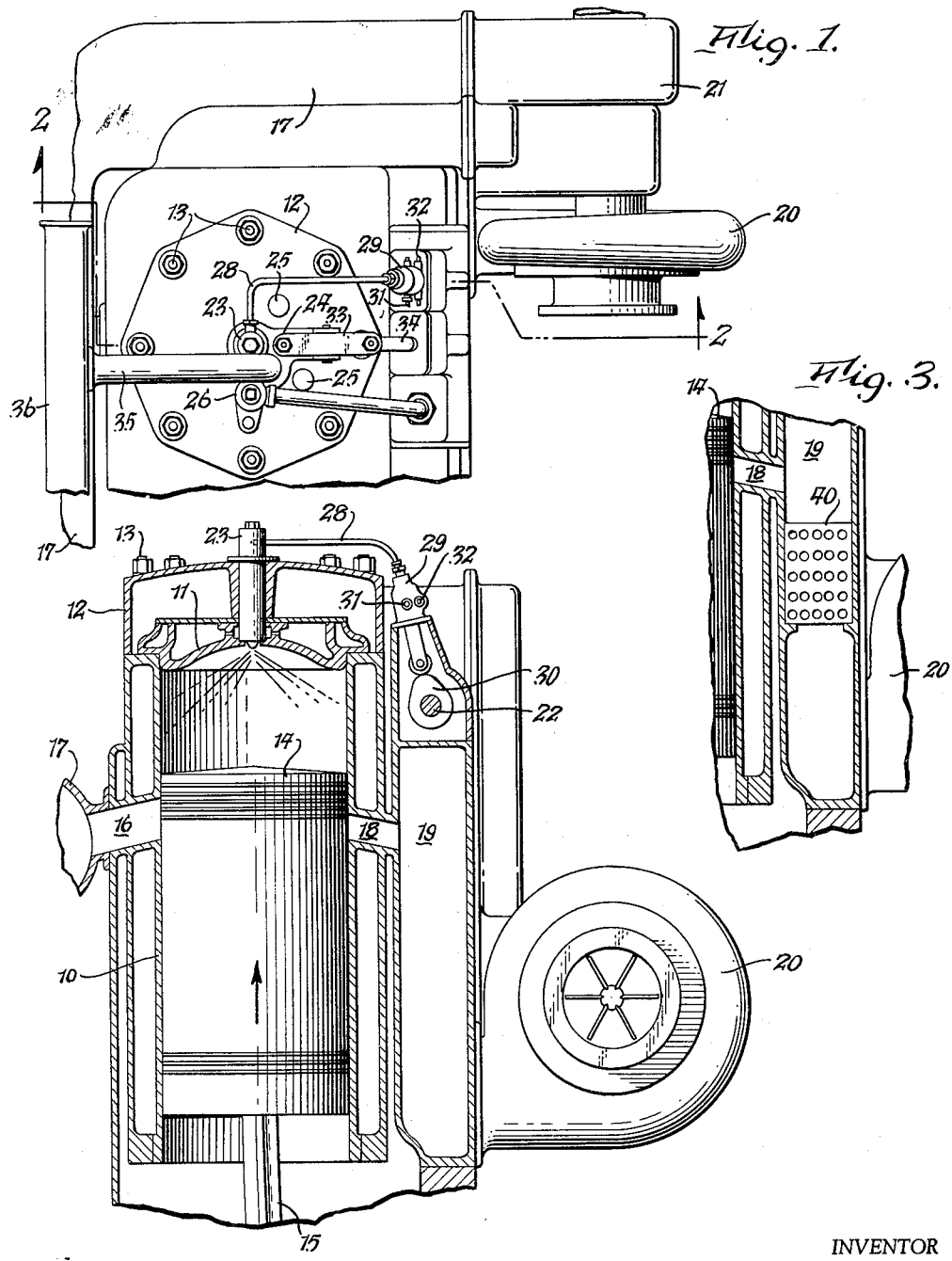
FIG. 1 is a fragmentary top plan view of an engine constructed in accordance with the principles of the present invention.
FIG. 2 is a fragmentary vertical transverse sectional view thereof and taken generally on line 2—2 of FIG. 1.
FIG. 3 is a fragmentary sectional view similar to FIG. 2 and showing a modification of structure.

While the present invention is applicable to any internal combustion engine, other than one of the diesel type, it has been illustrated and will be described in connection with a 2-cycle turbocharged gas engine. In pertinent part such a 2-cycle engine is shown in FIGS. 1 and 2. Only one cylinder of such an engine has been illustrated but the invention is applicable to an engine having any number of cylinders.

The engine is shown as having a water jacketed power cylinder 10, closed at its upper end by a cylinder head 11 and head cover 12 bolted to the cylinder by a series of studs 13. A piston 14 is shown as reciprocably arranged within the cylinder and connected by means of a connecting rod 15 to a crankshaft (not shown) in a well known manner.

Also as is well known, the cylinder is provided with exhaust ports 16 communicating with an exhaust manifold 17, and also with scavenging air ports 18. These ports 18 are shown as communicating with an air chest or chamber 19 to which air is supplied by a blower 20. The blower 20 is shown as driven by an exhaust turbine 21 which is operated by the exhaust gas in the manifold 17. In this manner the engine is turbocharged.

Running lengthwise of the engine and above the air chest 19 is shown a camshaft 22 which is driven in the usual manner.

Referring to FIG. 1, the cylinder head and head cover 11, 12 are shown as provided with passages therethrough and leading to the interior of the cylinder to accommodate a liquid auto-ignition suppressant injection nozzle 23, a fuel injector valve 24, one or more spark plugs 25, and an air starting valve 26.

The liquid suppressant injection nozzle 23 is preferably arranged as shown at the center of the cylinder head 11 and is capable of discharging a finely atomized spray or mist of the liquid suppressant directly into the cylinder 10. The liquid suppressant under pressure is supplied to the nozzle 23 through the line 28 from a pump 29 operated by a cam 30 on the camshaft 22. Thus when the cam 30 is rotated the plunger of the pump 29 is reciprocated to discharge a measured amount of liquid suppressant into the line 28. The pump 29 is supplied with liquid suppressant through a line 31 leading from any suitable source of the same (not shown).

The pump 29 may be of any suitable type and preferably has means for adjustably controlling the amount of liquid suppressant discharged thereby each time the pump is cycled. For example, the pump 29 may be an adaptation of a commercially available type used for injecting liquid fuel in a diesel engine. Such a pump has a control member 32 in the form of a reciprocable rack. By displacing such member 32 in one direction or the other the amount of liquid pumped on each stroke of the pump is caused to be either increased or decreased. In this manner the amount of liquid suppressant injected into the cylinder can be controlled.

The liquid suppressant injection nozzle 23 may also be of any suitable form and as shown is an adaptation of a commercially available injection nozzle used for injecting liquid fuel in diesel engines.

The fuel injection value 24 is shown as arranged adjacent the liquid suppressant spray nozzle 23 and preferably inclines inwardly toward the central axis of the cylinder 10. This fuel injection valve 24 is of a conventional type and is operated in the conventional manner by a drive including a rocker 33 and a push rod 34, the lower end of which rod is actuated by a cam on the camshaft 22 in a well known manner. Gas fuel is supplied to injection valve 24 by a fuel inlet conduit 35 connected to a gas header 36.

The air starting valve 26 is of a conventional type and is also operated from the cam shaft 22 and is used only to start the engine, as is well known.

The normal cycle of operation of the 2-cycle engine engine illustrated is not interfered with by the practice of the present invention except that during the upward sroke of the piston 14 within the cylinder 10, a predetermined amount of liquid auto-ignition suppressant is sprayed by the nozzle 23 directly into the cylinder in the space above the piston. As to timing, this occurs so that no liquid suppressant is discharged into the exhaust ports 16. The angular position or orientation of the cam 30 on the cam shaft 22 will control the timing of the liquid suppressant injection spray.

The liquid auto-ignition suppressant is preferably water because of its effectiveness and cheapness for the practice of the present invention, but it is to be clearly understood that any other liquid preparation suitable to suppress auto-ignition, such as a tetraethyl lead solution or other known chemicals or solutions thereof, is contemplated and intended to be included within the scope of the generic designation "liquid auto-ignition suppressant" or "liquid suppressant" as used herein.

As previously mentioned, the amount of liquid supressant injected each time can be controlled by adjustment of the control member 32 on the pump 29. The amount of liquid suppressant injected directly into the cylinder should be so controlled that all of the liquid suppressant is evaporated in the air trapped within the cylinder and being compressed by the upwardly moving piston and so that none of the liquid suppressant has an opportunity to wet the cylinder walls or any other surfaces within the engine. By avoiding such wetting of metal surfaces, the precipitation of dissolved solids in the liquid suppressant will not occur. It is not known definitely what happens to such dissolved solids when the liquid suppressant is completely evaporated but it is believed that the dissolved solids form very minute particles which remain suspended in the gaseous mixture and are discharged from the cylinder the next time the same is exhausted.

Aside from the matter of avoiding dissolved solids in the liquid suppressant from being deposited on metal surfaces within the engine, it is important to control the amount of liquid suppressant injected into the cylinder. Generally speaking, the amount of liquid suppressant injected will increase with increase in the temperature of the air admitted into the cylinder through the ports 18. It will increase with an increase in the brake mean effective pressure. It will also increase with an increase in the compression ratio; and it will increase with a decrease in the scavenging air flow. In short, the amount of liquid suppressant injected into the cylinder will increase as the terminal compression temperature of the combustible mixture within the cylinder increases. It is apparent that if insufficient liquid suppressant is injected into the combustible mixture, insufficient cooling thereof will result and auto-ignition is likely to occur, the very condition sought to be avoided.

On the other hand, it is also undesirable to introduce an excess of liquid suppressant into the cylinder. If more liquid suppressant is injected than is needed merely to prevent auto-ignition, an increase in fuel consumption results. The optimum point is to inject an amount of liquid suppressant sufficient merely to prevent auto-ignition.

As a practical matter, this point can be detected by an attendant who can adjust the member 32 on the pump 29 by the sound of the engine. If the engine beings to rattle, it is on the threshold of auto-ignition. By moving the control member 32 so as to increase the amount of liquid suppressant discharged by the pump but by an amount merely sufficient to eliminate the rattle, the ideal amount of liquid suppressant is being admitted into the cylinder.

In the apparatus shown in FIGS. 1 and 2, it will be noted that there are no cooling means provided for cooling the scavenging and combustion air after discharge from the blower 20. A modification of such structure providing such a cooling means is illustrated in FIG. 3. As there shown, a water-to-air cooler 40 is arranged in the air chest 19. The blower 20 would then discharge compressed air into the space below the cooler 40 and in passing upwardly through this cooler the temperature of the air would be reduced before admission into the scavenging ports 18.

Actual tests show that a 2-cycle turbo-charged gas engine with air cooling as provided by the cooler 40 shown in FIG. 3, operates at 36% thermal efficiency, whereas the same engine into the cylinders of which water was directly injected in accordance with the present invention operated at aout 40% thermal efficiency. Thus a substantial increase was realized through the practice of the present invention. The compression ratio of the engine operating with normal air cooling was 7.5 to 1, whereas with water injection the compression ratio was between 11 and 12 to 1. Expressed another way, whereas it required 7,000 B.t.u. per brake horsepower per hour for the engine when operating with normal air cooling, it required only 6,370 B.t.u. per brake horsepower per hour when the engine was operated with water injection. With the air cooler 40 shown in FIG. 3 being used on an engine less water is required to be injected into the cylinder to produce equivalent results than when the engine is not provided with such as air cooler. It was founded by actual tests that 0.1 pound per horsepower per hour more water was required when air was admitted to the cylinder without preliminary cooling.

It is preferred to eliminate the air cooler 40 as shown in FIG. 3 so that the cost of such cooler can be avoided, and also a saving on the installation cost of the cooling water system used for the air cooler 40. The saving realized more than offsets the cost of the additional equipment used to inject liquid suppressant directly into the cylinder in accordance with the present invention.

Apparatus other than that disclosed for pumping or supplying or injecting liquid suppressant into the engine cylinders will readily suggest itself to those skilled in the art. Therefore, the means shown are intended to be illustrative rather than limitative, except as the appended claims might otherwise define.

From the foregoing, it will be seen that the present invention provides a method and apparatus for inhibiting auto ignition in an internal combustible engine when operated at higher compression ratios in order to economize on fuel consumption. This result is achieved in a simple, relatively inexpensive and effective manner which provides savings not only in the initial cost of the engine and its installation but also in its operation and maintenance over an extended period of time.

What is claimed is:

1. In the operation of an internal combustion engine including a cylinder and piston and having such a compression ratio that auto-ignition can occur, the method of inhibiting auto-ignition comprising the step of injecting just that amount of liquid auto-ignition suppressant directly into the combustion chamber of each engine cylinder without contacting the wall thereof or the piston only during the compression phase thereof as will keep the engine at the threshold of auto-ignition as determined by the sound of the engine.

2. In the operation of an internal combustion engine including a cylinder and piston and having such a compression ratio that auto-ignition can occur, the method of inhibiting auto-ignition comprising the steps of injecting an excess of liquid auto-ignition suppressant directly into the combustion chamber of each engine cylinder without contacting the wall thereof or the piston only during the compression phase thereof, and progressively reducing the amount of such liquid suppressant during succeeding cycles until the threshold of auto-ignition is reached as determined by the sound of the engine.

3. In the operation of an internal combustion engine including a cylinder and piston and having such a compression ratio that auto-ignition can occur, the method of inhibiting auto-ignition comprising the steps of injecting directly into the combustion chamber of each engine cylinder without contacting the wall thereof or the piston and only during the compression phase thereof just that amount of liquid auto-ignition suppressant as will keep the engine at the threshold of auto-ignition as determined by the sound of the engine, and adjusting the amount of such liquid suppressant injected to preserve such threshold condition as load on the engine varies.

4. The method of inhibiting auto-ignition in an internal combustion engine having at least one cylinder and a piston therein, which method comprises operating the engine under conditions where auto-ignition would normally occur, and injecting just that amount of auto-ignition suppressant as a liquid directly into the combustion chamber of each engine cylinder without contacting the wall thereof or the piston only during the compression phase thereof as will keep the engine at the threshold of auto-ignition.

References Cited in the file of this patent

UNITED STATES PATENTS

| | | |
|---|---|---|
| 795,422 | Thomson | July 25, 1905 |
| 885,820 | Winand et al. | Apr. 28, 1908 |
| 898,512 | Schreber | Sept. 15, 1908 |
| 1,349,952 | Hammond | Aug. 17, 1920 |
| 1,555,991 | Konar | Oct. 6, 1925 |
| 1,770,608 | Fischer | July 15, 1930 |
| 2,584,560 | Darche | Feb. 5, 1952 |

FOREIGN PATENTS

| | | |
|---|---|---|
| 326,794 | Great Britain | Mar. 17, 1930 |